United States Patent
Huber et al.

(10) Patent No.: US 12,092,489 B2
(45) Date of Patent: Sep. 17, 2024

(54) CLUTCH DEVICE FOR A GEARBOX OF A UTILITY VEHICLE

(71) Applicant: Knorr-Bremse Systeme Fuer Nutzfahrzeuge GmbH, Munich (DE)

(72) Inventors: Christian Huber, Munich (DE); Martin Fieber, Wiedenzhausen (DE)

(73) Assignee: KNORR-BREMSE SYSTEME FUER NUTZFAHRZEUGE GMBH, Munich (DE)

(*) Notice: Subject to any disclaimer, the term of this patent is extended or adjusted under 35 U.S.C. 154(b) by 0 days.

(21) Appl. No.: 18/000,286

(22) PCT Filed: Jul. 7, 2021

(86) PCT No.: PCT/EP2021/068792
§ 371 (c)(1),
(2) Date: Nov. 29, 2022

(87) PCT Pub. No.: WO2022/017787
PCT Pub. Date: Jan. 27, 2022

(65) Prior Publication Data
US 2023/0144626 A1    May 11, 2023

(30) Foreign Application Priority Data
Jul. 21, 2020 (DE) ............ 10 2020 119 185.5

(51) Int. Cl.
*G01D 5/14* (2006.01)
*F16D 25/08* (2006.01)

(52) U.S. Cl.
CPC ............ *G01D 5/14* (2013.01); *F16D 25/083* (2013.01); *F16D 2300/18* (2013.01)

(58) Field of Classification Search
CPC .......... F16D 25/00–14; F16D 2300/18; G01D 5/00–62
See application file for complete search history.

(56) References Cited

U.S. PATENT DOCUMENTS

2021/0181046 A1* 6/2021 Hofmann ............. G01L 5/0061

FOREIGN PATENT DOCUMENTS

| DE | 20315735 U1 * | 1/2004 | .......... F15B 15/2861 |
| DE | 102008007941 A1 * | 8/2009 | ........ F16D 65/0978 |
| DE | 102009042807 A1 | 5/2010 | |
| DE | 102010033069 A1 * | 3/2011 | ........... F16D 25/088 |
| DE | 102012223736 A1 * | 6/2014 | .......... F15B 15/1447 |
| DE | 102013211919 A1 * | 12/2014 | ........... H02K 49/108 |

(Continued)

OTHER PUBLICATIONS

International Search Report for PCT/EP2021/068792, Issued Oct. 13, 2021.

*Primary Examiner* — Ernesto A Suarez
*Assistant Examiner* — Lillian T Nguyen
(74) *Attorney, Agent, or Firm* — NORTON ROSE FULBRIGHT US LLP; Gerard A. Messina

(57) ABSTRACT

A clutch device for a gearbox of a utility vehicle, including: a clutch actuator; a sensor for detecting a position of the clutch actuator; and a sensor stop having a stop surface, which defines a predetermined position of the sensor in a distance direction to the clutch actuator; in which the sensor is holdable via an elastic element in a distance direction in a positionally fixed relationship with the sensor stop.

18 Claims, 2 Drawing Sheets

(56) References Cited

FOREIGN PATENT DOCUMENTS

| | | | |
|---|---|---|---|
| DE | 102016223608 A1 | 5/2018 | |
| DE | 102018104676 B3 | 6/2019 | |
| EP | 0656526 A1 * | 6/1995 | ............. G01D 5/147 |
| EP | 1365167 A2 | 11/2003 | |
| JP | H01136951 A | 5/1989 | |
| JP | H0262595 A | 3/1990 | |
| JP | H0375303 A | 3/1991 | |
| JP | H0421041 A | 1/1992 | |
| JP | 2017020601 A | 1/2017 | |

* cited by examiner

CLUTCH DEVICE FOR A GEARBOX OF A UTILITY VEHICLE

FIELD OF THE INVENTION

The invention relates to a clutch device for a gearbox of a utility vehicle.

BACKGROUND INFORMATION

Many gearboxes of utility vehicles, in particular for local and distribution transport, long-distance passenger transport, and for overland and coach transport, have a group configuration that has a plurality of gear steps. This configuration is used in utility vehicles to an increasing extent for automated manual transmissions (AMT).

Gearboxes for utility vehicles can have, in principle, different degrees of automation. Depending on the configuration of the starting process, the actuation of the gearshift clutch and the gear selection can be carried out in an automated manner. None of these processes is automated in manual transmissions. In semi-automated transmissions, one of these processes is automated and in fully automatic transmissions, all processes are carried out in an automated manner. This yields the necessity to use suitable actuation devices for an automated launch clutch, an automated engagement of the clutch during shifting and/or an automated gear selection, and an engine management. For the automation of shifting, in particular, the precise detection of the position of the shift elements is relevant for optimizing and increasing the efficiency of the automated shift sequence. The sensor system for this purpose is usually located in the area of the transmission. A sensing of the clutch actuator is necessary for detecting the clutch position. For example, a position sensor is screwed into place. In addition, the installation during servicing is carried out blindly. Therefore, it cannot be ensured under any circumstances or only with greater effort that the position sensor is held in a predetermined reference position, which affects the accuracy of the position detection.

SUMMARY OF THE INVENTION

In light of the comments presented above, the problem addressed by the present invention is to provide a clutch detection for a gearbox of a utility vehicle, by which the accuracy of the position detection can be improved.

The problem is solved by a clutch device for a gearbox of a utility vehicle according to the independent claim. Advantageous refinements of the invention are described in the dependent claims.

According to the invention, a clutch device for a gearbox of a utility vehicle includes a clutch actuator, a sensor for detecting a position of the clutch actuator, and a sensor stop that has a stop surface, which defines a predetermined position of the sensor in a distance direction to the clutch actuator, wherein the sensor is holdable in a fixed position relative to the sensor stop in the distance direction via an elastic element.

The sensor is thus pressed against the stop surface of the sensor stop via the elastic element. The sensor therefore assumes a predetermined reference position. In particular, as a result, air gaps between the sensor and the stop surface, which could disadvantageously affect the accuracy of the sensor, can also be avoided or at least reduced.

In one embodiment, the sensor stop is formed by a clutch actuator housing.

The sensor is therefore pressed against a stop surface formed by the clutch actuator housing. Since the clutch actuator housing for the clutch actuator forms a position reference, i.e., can describe the position of the clutch actuator in relation to the clutch actuator housing, the sensor can therefore form a comparable position reference.

In one refinement, the sensor is floatingly mounted in a plane parallel the stop surface.

Even though the stop surface of the sensor stop represents a unilateral position limitation for the sensor, the sensor is movable at least in the plane perpendicularly to the stop direction, in order, for example, to be able to carry out translatory or rotatory compensatory movements in this plane. In addition, the elastic element can be configured in such a way that appropriate compensatory movements are also enabled in a plane parallel to the stop direction, i.e., for example, toward the elastic element. The floating mounting is used, on the one hand, for supporting the uniform pressing of the sensor against the stop surface, but also can also be used for vibration compensation. In addition, the replaceability of the sensor can also be simplified as a result.

According to one embodiment, the elastic element is arranged between the sensor and a valve unit situated opposite the stop surface.

The elastic element can therefore rest against the valve unit and, in the installed condition, is held between the valve unit and the sensor. Therefore, neither the sensor nor the elastic element absolutely require additional fasteners. In addition, the sensor can be installed directly with the elastic element and the valve unit in one step during the assembly of the valve unit. For this purpose, fasteners, such as screw connections, can be provided for forming the assembly for the assembly process or transport. After assembly, these fasteners between the assembly components can be dispensed with, however, solely with respect to performing the function of sensor holding, as described above.

In particular, a side of the elastic element facing away from the sensor rests via the entire surface of the elastic element against the valve unit.

The sensor can therefore rest against the valve unit via the elastic element with its entire surface facing the valve unit, so that the contact pressure is uniformly distributed onto the sensor. In this way, for example, undesirable tilting of the sensor can be avoided.

According to one embodiment, the elastic element includes a spring element made of spring steel, in particular as a spiral spring, a leaf spring, a plate spring, or a wave spring, or is formed from spring steel.

Spring elements made of spring steel, in particular spiral springs, leaf springs, plate springs, or wave springs, are cost-effectively available and offer a wide range of applications with respect to adjustable spring forces and surroundings conditions.

Alternatively or additionally, the elastic element includes a spring element made of an elastomer, in particular a punched out or injected elastomer, or is formed from an elastomer.

Elastomers can assume nearly any shape and thus offer a great deal of configuration freedom specifically with respect to structure. In addition to the elastomer, according to a supplementary embodiment, spring elements made of spring steel in the elastomer or together with the elastomer can form the elastic element.

Alternatively or additionally, furthermore, the elastic element has a friction-reducing coating, in particular a PTFE coating, which may be at least on a side of the elastic element facing away from the sensor, or is made of the friction-reducing coating.

A friction-reducing coating, such as a PTFE coating, i.e., a coating containing polytetrafluoroethylene, can, for example, reduce the friction between the valve unit and the elastic element, so that the floating mounting of the sensor is supported. Correspondingly, alternatively or additionally, the side of the elastic element facing the sensor can also have a friction-reducing coating of this type. The term "friction-reducing" is directed to a coating that effectuates a lower friction, for example, with respect to a direct contact between the sensor and the valve unit, in the case of an elastic element arranged between the sensor and the valve unit.

In one embodiment, the sensor stop has at least one projection pointing from the stop surface in the direction of the sensor and/or the sensor has at least one projection pointing from a side facing the stop surface in the direction of the sensor stop, in particular, a projection, as an insertion bevel, pointing further away from the side of the sensor facing the stop surface as the distance from the stop surface or from the side of the sensor facing the stop surface increases.

The projection can be formed, for example, from guide plates or also configured as a recess, such as a stop surface recessed with respect to the clutch actuator housing surface in the case of the sensor stop assignable to the clutch actuator housing. In particular, the projection or the recess can be formed with an insertion bevel, i.e., have an angle opening from the origin of the projection, so that the insertion of the sensor onto the stop surface is facilitated. The projection can encompass the entire stop surface or also be formed in sections. Comparably, the projection can also be formed at the sensor, in order, for example, to interact with a corresponding projection or a corresponding recess of the sensor stop for positioning the sensor.

In particular, the extension of the at least one projection in a direction perpendicular to the stop surface is smaller than the minimum extension of the elastic element in this direction.

Accordingly, for example, the depth of the recess for the sensor formed by the projection is smaller in the direction of the stop surface than the installation space in this direction to be provided for the elastic element on a side of the sensor facing away from the stop surface. In other words, by removing the elastic element, sufficient space can therefore be created to also accommodate the sensor from the recess formed by the projection. As a result, the replaceability of the sensor is supported.

According to one embodiment, the sensor is adapted for detecting a position of a magnet situated in a fixed position relative to the clutch actuator.

The magnet is the target object representing the position of the clutch actuator and which is to be detected using the sensor and/or interacts with the magnet for detecting the position of the clutch actuator. By arranging the magnet, the target object can be favorably arranged with respect to the sensor and/or to the reference position, for example, as a function of structural and/or measurement-related limiting conditions.

In particular, the sensor is configured as a magnetic sensor, in particular as a Hall sensor, a 3D Hall sensor, a GMR sensor, or an AMR sensor, or as an inductive sensor, in particular as a PLCD sensor.

The magnetic sensor can be used, in particular, with the above-described magnet of the clutch actuator for position detection.

In one embodiment, the sensor is connectable via plugs, lines, and/or lead frames to a control device for controlling the gearbox.

Accordingly, the position of the clutch actuator or an appropriate position signal can be transmitted to the controller of the gearbox, in order to implement various degrees of automation of the gearbox. The signal transmission can also be used for monitoring the gearbox, however.

The invention is explained in the following in greater detail with reference to the attached figures.

DETAILED DESCRIPTION

Figure 1:
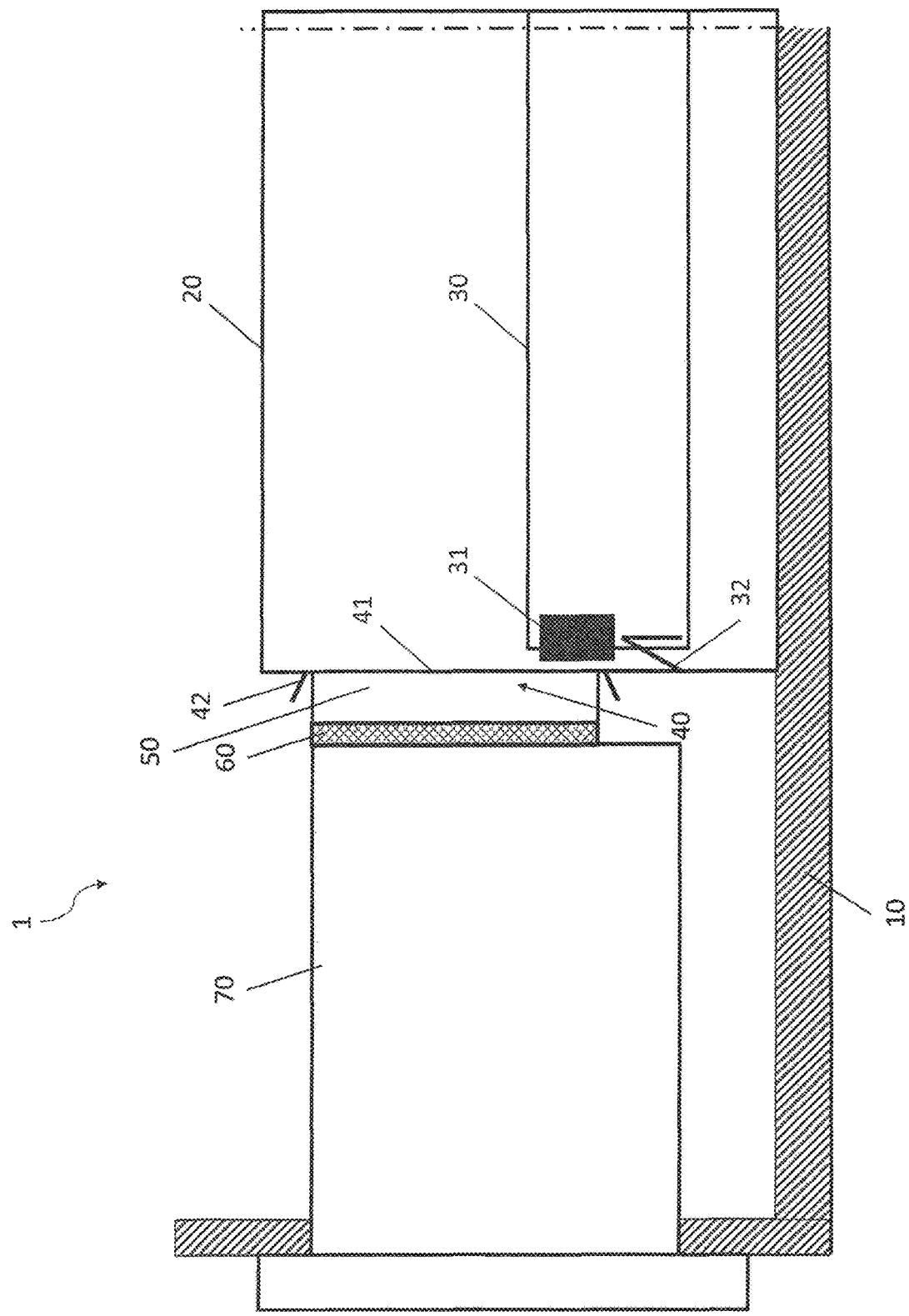
FIG. 1 shows a schematic cross-sectional view of a clutch device according to a first embodiment.

FIG. 1 is a schematic cross-sectional view of a clutch device 1 according to a first embodiment. The clutch device 1 includes a clutch housing 10 and, arranged therein, a clutch actuator housing 20 that includes a piston 30 as a clutch actuator that includes a piston seal 32. A magnet 31 is arranged at an end face perpendicular to the movement direction of the piston 30, the magnet 31 thus being moved in a positionally fixed relationship with the piston 30. The particular distance of the magnet 31 to a side of the clutch actuator housing 20 facing the magnet 31 in the direction of the piston movement corresponds to a particular position of the piston 30. The sensor 50 is therefore arranged in such a way that the sensor 50 assumes a predetermined position, as the reference position, in the distance direction to the piston 30. The distance direction of the sensor 50 to the piston 30 or the magnet 31 is the movement direction of the piston 30 in this case. Accordingly, the position of the piston 30 as the clutch actuator necessary for an activation and/or monitoring of the clutch device 1 can be detected via absolute or relative distance changes and/or direct distance detections of the magnet 31 by the sensor 50.

In order to arrange the sensor 50 in a position that is usable as a reference position, the clutch actuator housing 20 includes a sensor stop 40 on a clutch actuator housing wall facing the magnet 31 in the direction of the piston movement. Specifically, the sensor stop 40 is on the side of the clutch actuator housing wall facing away from the magnet 31. As shown in FIG. 1, the sensor stop has a stop surface 41 and a projection 42. The projection 42 is formed in this case via a guide plate pointing from the stop surface 41 in the direction of the sensor 50 and further away from the sensor 50 as the distance from the stop surface 41 increases. In other words, the projection 42 forms insertion bevels, in order, for example, to be able to more easily position the sensor 50 on the stop surface 41 during assembly. The projection is configured in this case, by way of example, circumferentially around the stop surface 41, but can also be provided only in sections.

The sensor 50 is pressed against the stop surface 41 via an elastic element 60 in order to retain the positionally fixed relationship with the stop surface 41 in the distance direction toward the magnet 31 in the direction of the piston movement. As a result, in particular, a reference position in a positionally fixed relationship with the stop surface 41 is formed, the reference position not forming an air gap—or at least only a small air gap—between the sensor 50 and the stop surface 41, in order to be able to achieve a measurement that is as accurate as possible. In the embodiment shown, the elastic element 60 is arranged between the sensor 50 and a valve unit 70. The valve unit 70 is inserted, for example, into an opening of the clutch housing 10 and held in the clutch housing 10 by fasteners or alternative fastening mechanisms. Since the distance between the valve unit 70 and the stop surface 41 of the sensor stop 40 can vary due to assembly and/or production tolerances, the sensor 50 can nevertheless be securely arranged and held in the position predetermined as the reference position via the elastic element 60. For this purpose, the elastic element 60 rests against the surface of the valve unit 70 facing the sensor 50. In FIG. 1, rests via its entire surface against the surface of the valve unit 70 facing the sensor via the side of the elastic element 60 facing away from the sensor 50. As a result, a uniform distribution of the contact pressure on the sensor 50 via the elastic element 60 can be achieved. The elastic element 60 and/or the sensor 50 are/is also configured in such a way that a uniform load distribution or load-bearing is enabled.

Figure 2:
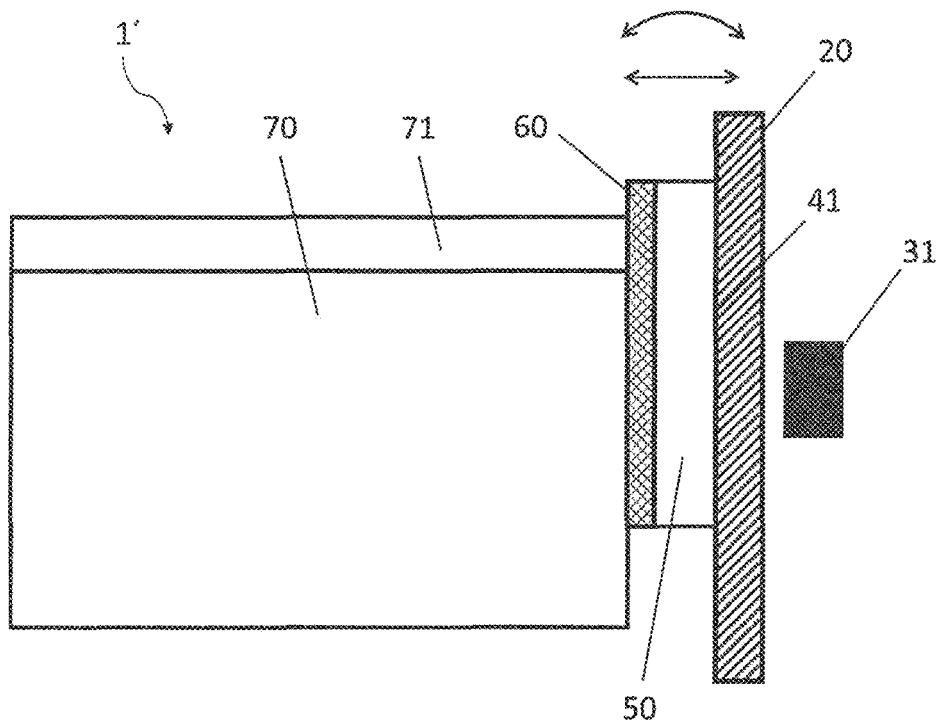
FIG. 2 shows a schematic cross-sectional view of a section of a clutch device according to a second embodiment.

FIG. 2 shows a schematic cross-sectional view of a section of a clutch device 1' according to a second embodiment. The clutch device 1' is comparable to the clutch device 1 shown in FIG. 1 with respect to the components not shown in FIG. 2, and so the section to be used only for explaining further modes of operation and differences is illustrated here.

The clutch device 1' shown in FIG. 2 differs from the clutch device 1 according to FIG. 1 in that the elastic element 60 is arranged at the valve unit 70 in such a way that the valve unit 70 no longer supports the surface of the elastic element 60 facing the valve unit over the entire surface of the elastic element 60 at the valve unit 70. As a result, further degrees of freedom in the structural configuration of the clutch device 1' can result with respect to a positioning of the sensor 50 and/or a dimensioning of the clutch device components. A limited support of the elastic element 60 by the valve unit 70 can also offer advantages in an arrangement of the sensor 50 with respect to the valve unit 70 in the distance direction of the sensor 50 to the magnet 31 in the direction of the piston movement, the arrangement deviating from a parallel spacing.

In addition, a housing cover 71 of the valve unit 70 is shown through the visible edge in the valve unit 70. This is not explicitly represented for the clutch device 1, but can be similarly provided. For example, the contact surface of the elastic element 60 at the valve unit 70 can be adapted by way of an appropriate dimensioning of the housing cover 71 and its possible replacement. As a result, the load distribution or the distribution of the contact pressure can be adapted according to demand.

Figure 3:
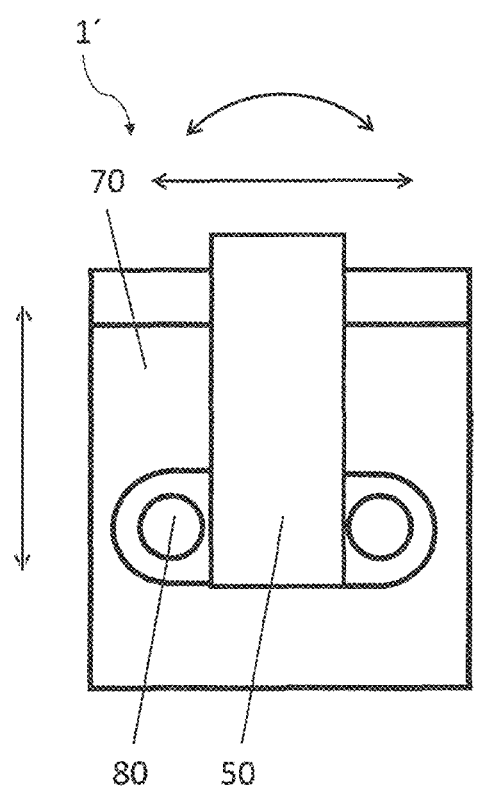
FIG. 3 shows a top view perpendicularly to the cross-sectional view of the section of the clutch device from FIG. 2.

In the following, a configuration of a floating mounting for the sensor 50 can be explained by way of example on the basis of the clutch device 1' with reference to FIGS. 2 and 3. FIG. 3 shows, for this purpose, a top view perpendicular to the cross-sectional view of the section of the clutch device 1' from FIG. 2. The floating mounting of the sensor 50 is not limited to the clutch device 1' according to the second embodiment, but rather can be applied similarly to the clutch device 1 according to the first embodiment.

Due to the contact pressure of the elastic element 60, the sensor 50 is pressed against the stop surface 41 formed by the clutch actuator housing 20. Via the elastic deformability of the elastic element 60, the sensor 50 nevertheless has the basic degrees of freedom represented by arrows in FIGS. 2 and 3 as a function of the contact pressure of these counteracting external forces. The term "basic" represents the aforementioned dependence of the movement according to existing force ratios. The floating mounting of the sensor 50, which is achievable as a result, having up to three degrees of freedom in a plane parallel to the stop surface 41 according to FIG. 3 and/or up to two degrees of freedom in a plane perpendicular to the stop surface 41 according to FIG. 2 enables, for example, a secure positioning of the sensor 50 at the stop surface 41 itself and an appropriate vibration compensation and the compensation of thermally induced component expansions. Possibilities for translatory and rotary compensation result due to the floating mounting.

The representation of the clutch device 1' shown in FIG. 3 also indicates fasteners 80, via which the elastic element 60 and/or the sensor 50 can be fastened at the valve unit. The exemplary description based on the clutch device 1' is also similarly applicable to the clutch device 1 in this case. The fasteners 80 can be configured as screws, via which the elastic element 60 and/or the sensor 50 are/is screwable together with the valve unit. The fastening of the elastic element 60 and/or the sensor 50 is not directed to a final positioning, in order to already arrange the sensor 50 in a reference position in this way. The reference position results according to the present embodiment via the contact pressure of the elastic element 60 in the distance direction of the sensor 50 to the magnet 31 in the direction of the piston movement, in order to press the sensor 50 against the stop surface 41. The elastic element 60 can also be configured in such a way that, by the elastic element 60, the sensor 50 can be held at the stop surface 41 and/or the elastic element 60 can be held. The fasteners 80 can additionally hold the elastic element 60 and/or the sensor 50, however, in order to increase the security and/or, in particular, for transporting and assembling an assembly that includes the valve unit 70, the elastic element 60, and the sensor 50. For example, an assembly of this type can be introduced into a housing opening of the clutch device 1'. The sensor 50 is positioned on the stop surface 41. The fasteners 80 hold, for example, the sensor 50 in such a way that the sensor 50 is held by the valve unit 70, but can still move in the degrees of freedom provided for the positioning and for compensation at least across a certain movement distance. Accordingly, the fasteners 80 do not necessarily need to be removed after assembly, in order to achieve a floating mounting. Once the sensor 50 has been positioned at the stop surface 41, the valve unit 70 can be locked in position at the clutch housing 10 or the like. Even if the locking process of the valve unit 70 could possibly once again induce a change in position of the valve unit 70 in the distance direction of the sensor 50 to the magnet 31, this is compensated for by the elastic element 60. This is advantageous specifically for the case in which accessibility for correcting the position of the sensor 50 does not exist after appropriate assembly and locking in position or a readjustment is implementable only with considerable effort.

The invention is not limited to the described embodiments. For example, a sensor, such as a sensor for detecting speed or position, can also be introduced from the outside into the housing and held by a housing component, such as a console. In principle, features of one embodiment are also transferrable to other embodiments and combinable with further features, provided this is reasonably possible.

The List of Reference Characters is as Follows:

- 1, 1' clutch device
- 10 clutch housing
- 20 clutch actuator housing
- 30 piston
- 31 magnet
- 32 piston seal
- 40 sensor stop
- 41 stop surface
- 42 projection
- 50 sensor
- 60 elastic element
- 70 valve unit
- 71 housing cover (valve unit)
- 80 fastener

The invention claimed is:

1. A clutch device for a gearbox of a utility vehicle, comprising:
   a clutch actuator;
   a sensor for detecting a position of the clutch actuator; and
   a sensor stop having a stop surface, which defines a predetermined position of the sensor in a distance direction to the clutch actuator;
   wherein the sensor is holdable via an elastic element in a distance direction in a positionally fixed relationship with the sensor stop, and
   wherein the elastic element is arranged between the sensor and a valve unit.

2. The clutch device of claim 1, wherein the sensor stop is formed by a clutch actuator housing.

3. The clutch device of claim 1, wherein the sensor is floatingly mounted in a plane parallel to the stop surface.

4. The clutch device of claim 1, wherein the valve unit is situated opposite the stop surface.

5. The clutch device of claim 4, wherein a side of the elastic element facing away from the sensor rests via its entire surface against the valve unit.

6. The clutch device of claim 1, wherein the elastic element includes a spring element made of spring steel, or is formed from spring steel.

7. The clutch device of claim 1, wherein the elastic element includes a spring element made of an elastomer, or is formed from an elastomer.

8. The clutch device of claim 1, wherein the elastic element has a friction-reducing coating or is made of the friction-reducing coating.

9. The clutch device of claim 1, wherein the sensor stop has a projection pointing from the stop surface in the direction of the sensor, pointing further away from the side of the sensor facing the stop surface as the distance from the stop surface or from the side of the sensor facing the stop surface increases.

10. The clutch device of claim 9, wherein an extension of the projection, which is of the sensor stop, in a direction perpendicular to the stop surface is smaller than the elastic element in this direction.

11. The clutch device of claim 1, wherein the sensor is adapted for detecting a position of a magnet situated in a fixed position relative to the clutch actuator.

12. The clutch device of claim 1, wherein the sensor includes a magnetic sensor or an inductive sensor.

13. The clutch device of claim 1, wherein the sensor is connectable via plugs, lines, and/or lead frames to a control device for controlling the gearbox.

14. The clutch device of claim 1, wherein the elastic element includes a spring element made of spring steel, including a spiral spring, a leaf spring, a plate spring, or a wave spring, or is formed from spring steel.

15. The clutch device of claim 1, wherein the elastic element includes a spring element made of a punched out or injected elastomer, or is formed from an elastomer.

16. The clutch device of claim 1, wherein the elastic element has a friction-reducing coating, which is a PTFE coating, at least on a side of the elastic element facing away from the sensor, or is made of the friction-reducing coating.

17. The clutch device of claim 1, wherein a projection pointing from a side facing the stop surface in the direction of the sensor stop, pointing further away from the side of the sensor facing the stop surface as the distance from the stop surface or from the side of the sensor facing the stop surface increases.

18. The clutch device of claim 1, wherein the sensor includes a magnetic sensor, which is a Hall sensor, a 3D Hall sensor, a GMR sensor, or an AMR sensor, or an inductive sensor which is a PLCD sensor.

* * * * *